(12) United States Patent
Hamann et al.

(10) Patent No.: US 7,800,334 B2
(45) Date of Patent: Sep. 21, 2010

(54) DRIVE SYSTEM

(75) Inventors: Jens Hamann, Fürth (DE); Uwe Ladra, Erlangen (DE); Dietmar Stoiber, Fürth (DE); Bernd Wedel, Nürnberg (DE)

(73) Assignee: Siemens Aktiengesellschaft, Müchen (DE)

( * ) Notice: Subject to any disclaimer, the term of this patent is extended or adjusted under 35 U.S.C. 154(b) by 544 days.

(21) Appl. No.: 11/569,375

(22) PCT Filed: May 18, 2005

(86) PCT No.: PCT/EP2005/052290

§ 371 (c)(1),
(2), (4) Date: Aug. 15, 2007

(87) PCT Pub. No.: WO2005/114829

PCT Pub. Date: Dec. 1, 2005

(65) Prior Publication Data

US 2008/0136362 A1    Jun. 12, 2008

(30) Foreign Application Priority Data

May 19, 2004    (DE) ........................ 10 2004 024 883

(51) Int. Cl.
    *G05B 1/06*    (2006.01)
(52) U.S. Cl. ........................ 318/638; 318/569; 318/625; 318/630; 310/90.5; 244/165
(58) Field of Classification Search ................ 318/569, 318/460, 62.5, 630, 632, 560, 625, 638; 310/75 D, 310/90.5; 700/174; 464/29; 244/165
See application file for complete search history.

(56) References Cited

U.S. PATENT DOCUMENTS

| 4,723,735 A | * | 2/1988 | Eisenhaure et al. | ......... 244/165 |
| 5,027,280 A | * | 6/1991 | Ando et al. | ................. 700/174 |
| 5,209,699 A | * | 5/1993 | Hashimoto et al. | ............ 464/29 |
| 5,270,600 A | * | 12/1993 | Hashimoto | ................ 310/75 D |

(Continued)

FOREIGN PATENT DOCUMENTS

JP    02142380    5/1990

(Continued)

OTHER PUBLICATIONS

"An Open Industrial Robot Based On SERCOS"; Xianliang Cao et al.: Jun. 10, 2002; Intelligent Control and Automation, 2002. Proceedings, pp. 1466-1470.

*Primary Examiner*—Paul Ip
(74) *Attorney, Agent, or Firm*—Henry M. Feiereisen; Ursula B. Day

(57) ABSTRACT

The invention relates to a drive system comprising a control unit (1), which is connected to drive units (3a, 3b, 3c, 3d, 3e, 3f, 3g) via a data bus (2) for the exchange of data. According to the invention, one drive unit (3a, 3b) is connected to the drive motor (7a, 7b) in order to control the latter (7a, 7b) and an additional drive unit (3c, 3d, 3e, 3f, 3g) is connected to a magnetic bearing (11c, 11d, 11e, 11f, 11g) of a magnetic spindle bearing arrangement (23) in order to control said bearing (11c, 11d, 11e, 11f, 11g). The invention thus provides a drive system, in which a magnetic spindle bearing arrangement (23) is integrated.

6 Claims, 3 Drawing Sheets

U.S. PATENT DOCUMENTS

| | | | | |
|---|---|---|---|---|
| 5,355,042 | A | * | 10/1994 | Lewis et al. ................. 310/90.5 |
| 5,720,010 | A | | 2/1998 | Watanabe et al. |
| 5,760,510 | A | * | 6/1998 | Nomura et al. ............ 310/90.5 |
| 5,880,550 | A | | 3/1999 | Fukao et al. |
| 6,380,652 | B1 | | 4/2002 | Ueyama et al. |
| 6,724,167 | B1 | * | 4/2004 | Tanaka ....................... 318/569 |

FOREIGN PATENT DOCUMENTS

| | | |
|---|---|---|
| JP | 04258524 | 9/1992 |
| JP | 8256497 A | 10/1996 |
| JP | 2002130277 A | 5/2002 |
| JP | 2004064934 A | 2/2004 |
| WO | WO 96/42133 | 12/1996 |

\* cited by examiner

DRIVE SYSTEM

BACKGROUND OF THE INVENTION

The invention relates to a drive system.

The invention also relates to a machine tool, production machine or a robot having the abovementioned drive system.

According to customary practice, machines, such as, for example, machine tools, production machines or robots, have a multiplicity of "machine axes", the movements and positions of which are controlled by a controller, in particular a numerical control. An important factor in this case is, inter alia, exact guidance of the relative movement and the relative position between a spindle of the machine and the workpiece to be machined. Machining of the workpiece by the tool produces the desired contour on the workpiece. In the process, the drives of the individual machine axes must perform very exact traverse and rotary movements. In addition to rapid and precise axis drives, the productivity, for example of a machine tool, depends on a high spindle speed. The spindle has a spindle drive motor which normally forms a unit with a spindle rotor. The spindle drive motor sets the spindle rotor in rotation. Virtually all the spindles used at present have a mechanical bearing arrangement, e.g. in the form of a rolling element bearing arrangement. The disadvantages of the mechanical bearings at high speeds are generally known. In this regard, high wear of the mechanical bearings occurs at high speeds. Since the lubricant supply to the bearings is complicated, the disturbances frequently occurring in the lubricant supply lead to an often premature failure of the bearing. A further problem constitutes the residual unbalance of the spindle rotor. This occurs in interaction with the machine structure and causes pronounced vibrations and noise at certain speeds.

Wear and vibration behavior can be considerably improved through the use of a magnetically mounted spindle. In many cases, magnetic spindle bearing arrangements are used according to the prior art. The magnetic spindle bearing arrangement is a contactless system in which magnetic forces controllable via magnetic bearings assume the role of the rolling elements. The position of the spindle rotor is in this case measured continuously and the magnetic forces are always dynamically readjusted in such a way that the spindle rotor keeps the desired position in the bearing center even during loading.

Shown in FIG. 1 in a schematic illustration is a magnetic spindle bearing arrangement 23. It comprises a spindle rotor 10, which is mounted by means of magnetic bearings 11c, 11d, 11e, 11f and 11g (only shown schematically for the sake of clarity), and a performance module 16. Each magnetic bearing 11c, 11d, 11e, 11f and 11g essentially comprises an electromagnetic yoke which is fitted with coils and acts on the passive spindle rotor 10. In this case, the magnetic bearings 11e and 11f carry out the guidance in the X direction, the magnetic bearings 11d and 11g carry out the guidance in the Y direction and the magnetic bearing 11c carries out the guidance in the Z direction. Assigned to the magnetic bearings 11c, 11d, 11e, 11f and 11g are respectively associated distance sensors 12c, 12d, 12e, 12f and 12g which measure the distance from the spindle rotor 10 and feed respectively associated analog actual position signals 15c, 15d, 15e, 15f and 15g as input variables to a performance module 16. The performance module 16 comprises control devices 18c, 18d, 18e, 18f and 18g which act on the respectively associated magnetic bearings 11c, 11d, 11e, 11f and 11g via respectively associated power converters 17c, 17d, 17e, 17f and 17g and via respectively associated lines 8c, 8d, 8e, 8f and 8g. In this case, the control devices 18c, 18d, 18e, 18f and 18g and the power converters 17c, 17d, 17e, 17f and 17g need not necessarily be an integral part of the performance module 16, but may also be present as individual components. The control devices 18c, 18d, 18e, 18f and 18g are connected to the respectively associated power converters 17c, 17d, 17e, 17f and 17g for the exchange of data, which is indicated by double arrows in FIG. 1. The performance module 16 and the magnetic bearings 11c, 11d, 11e, 11f and 11g form a control loop which keeps the spindle rotor 10 floating.

Furthermore, a commercially available drive system of a machine, such as, for example, a machine tool, a production machine or a robot, is shown in FIG. 1. Via a data bus 2, of a two-axis machine in the example, a controller 1 is connected to a drive device 3a and 3b for activating the drive motors 7a and 7b and in particular to a control device 4a and 4b. The data communicated via the data bus 2 are, for example, speed, acceleration and position data of the individual drives. The control device 4a and 4b activates a respectively associated power converter 5a and 5b via a respectively associated connection 6a and 6b. The power converters 5a and 5b activate respectively associated drive motors 7a and 7b via respectively associated 3-phase lines 8a and 8b. In this case, each drive motor 7a and 7b activates a respective machine axis of the machine. A respective actual position encoder 12a and 12b is assigned to each drive motor 7a and 7b, an actual position signal 15a being fed as input variable to the control device 4a by the actual position encoder 12a and an actual position signal 15b being fed as input variable to the control device 4b by the actual position encoder 12b. In this case, each drive device comprises a control device and a power converter, although the control device and the power converter need not necessarily be accommodated in a common housing. The control device and power converter may also quite easily be in the form of separate components. The controller 1, for example, inputs position setpoints into the control device 4a and 4b via the data bus 2. The actual position values 15a and 15b are then controlled in accordance with the position setpoints input by the controller 1 and the machine axes are moved in this way.

As shown in FIG. 1, a commercially available drive system of a machine has no connection to the magnetic spindle bearing arrangement 23. The power converters 5a and 5b for activating the drive motors 7a and 7b are, as shown in FIG. 1, three-phase, whereas the power converters 17c, 17d, 17e, 17f and 17g of the magnetic spindle bearing arrangement 23 are only two-phase. For this reason, the drive devices, in particular the power converters 5a and 5b which serve to activate the drive motors 7a and 7b and the power converters of the spindle bearing arrangement, have hitherto not been regarded as being interchangeable. This results in considerable disadvantages with regard to maintenance of machines and the stockkeeping of spare parts for machines having a magnetic spindle bearing arrangement.

Furthermore, the actual position encoders 12a and 12b, according to customary practice, always deliver incremental actual position signals 15a and 15b, whereas the actual position encoders 12c, 12d, 12e, 12f and 12g of the magnetic spindle bearing arrangement 23 deliver analog actual position signals 15c, 15d, 15e, 15f and 15g. For this reason, the control devices 4a and 4b have hitherto not been regarded as being interchangeable with, for example, the control devices 18c and 18d of the performance module 16 for the magnetic spindle bearing arrangement. As with the power converters, this likewise has considerable disadvantages with regard to maintenance and stockkeeping of spare parts. In addition, due to the separation of the drive system and the magnetic spindle bearing arrangement 23, two different procedures for the drive devices 3a and 3b on the one hand and for the magnetic spindle bearing arrangement 23 on the other hand are to be taken into account during start-up.

As a result, the labor cost for start-up and maintenance is considerably increased. Since the control devices 18c, 18d, 18e, 18f and 18g of the magnetic spindle bearing arrangement 23 have no communication with the controller 1, the magnetic spindle bearing arrangement 23 also cannot be integrated in the motion guidance of the machine axes, e.g. for vibration damping.

Furthermore, a modern controller of a machine, in particular a numerical control, contains diverse diagnostic possibilities, extending right through to remote diagnosis via the Internet. However, since the magnetic spindle bearing arrangement 23, according to customary practice, does not communicate with the controller 1 via the data bus 2, it also cannot be included in the diagnostic possibilities already existing.

SUMMARY OF THE INVENTION

The object of the invention is therefore to integrate a magnetic spindle bearing arrangement in a drive system.

This object is achieved by a drive system comprising a controller which is connected to drive devices via a data bus for the exchange of data, one drive device for activating a drive motor being connected to the drive motor and a further drive device for activating a magnetic bearing of a magnetic spindle bearing arrangement being connected to the magnetic bearing.

Advantageous configurations of the invention follow from the subclaims.

A first advantageous design of the invention is characterized in that the drive devices each have a control device and a power converter. According to customary practice, drive devices have a control device and a power converter.

Furthermore, it proves to be advantageous if the drive device and the further drive device have identical hardware. This measure standardizes the hardware and increases the reliability and availability of the drive system according to the invention. Furthermore, the costs for the control devices and the power converters for the magnetic spindle bearing arrangement are reduced.

Furthermore, it proves to be advantageous that the drive devices are connected to a common grid power supply device for the electrical power supply. This makes it possible to standardize the hardware and reduce the costs for the hardware.

Furthermore, it proves to be advantageous that the power converter of the further drive device is designed as a 3-phase power converter. This makes it possible to standardize the hardware, a factor which has a positive effect on the reliability and availability of the drive system and at the same time reduces the costs for the drive system.

In this connection, it proves to be advantageous if the control device of the further drive device is set in such a way that two current-carrying phases of a power converter have a current of identical magnitude but opposite sign. This provides a simple and elegant means of operating a 3-phase power converter like a 2-phase power converter.

Furthermore, it proves to be advantageous if a signal converter for converting an analog actual position signal from the magnetic spindle bearing arrangement to an incremental actual position signal is provided. This enables control devices which require an incremental actual position signal as input variables to also be used for control devices of the magnetic spindle bearing arrangement.

The drive system according to the invention is especially suitable for use as a drive system in a machine tool, a production machine or a robot, as magnetic spindle bearing arrangements are used in these technical fields. However, the drive system according to the invention can of course also be used in other technical fields.

BRIEF DESCRIPTION OF THE DRAWING

An exemplary embodiment of the invention is shown in the drawing and explained in more detail below. In the drawing.

DETAILED DESCRIPTION OF PREFERRED EMBODIMENTS

Figure 1:
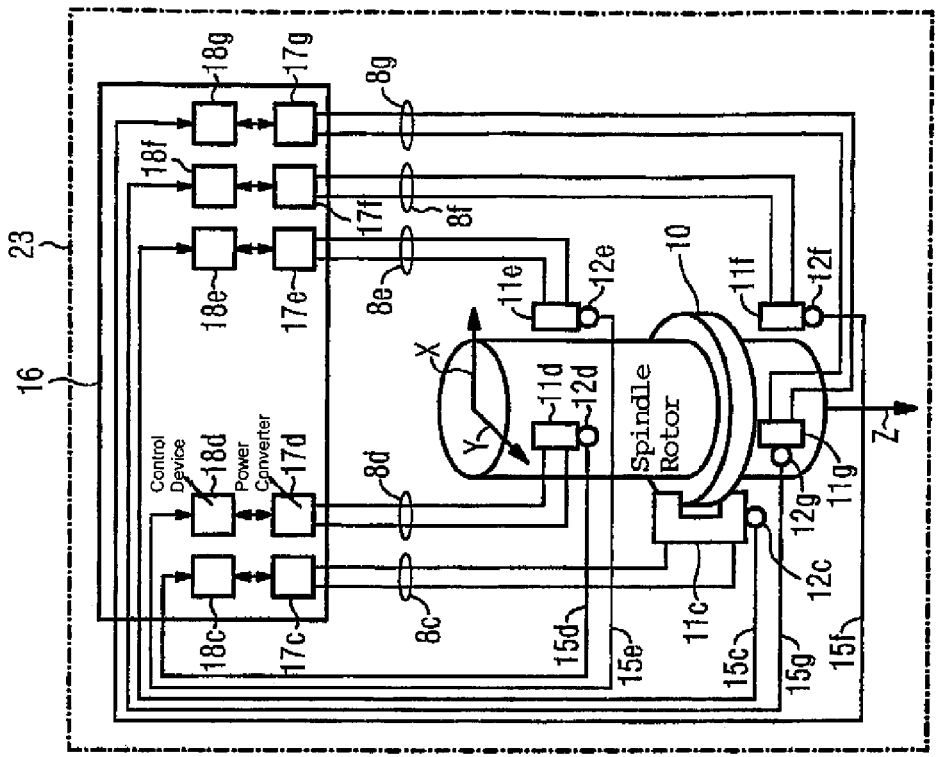
FIG. 1 shows a drive system and a magnetic spindle bearing arrangement according to the prior art.
Figure 1:
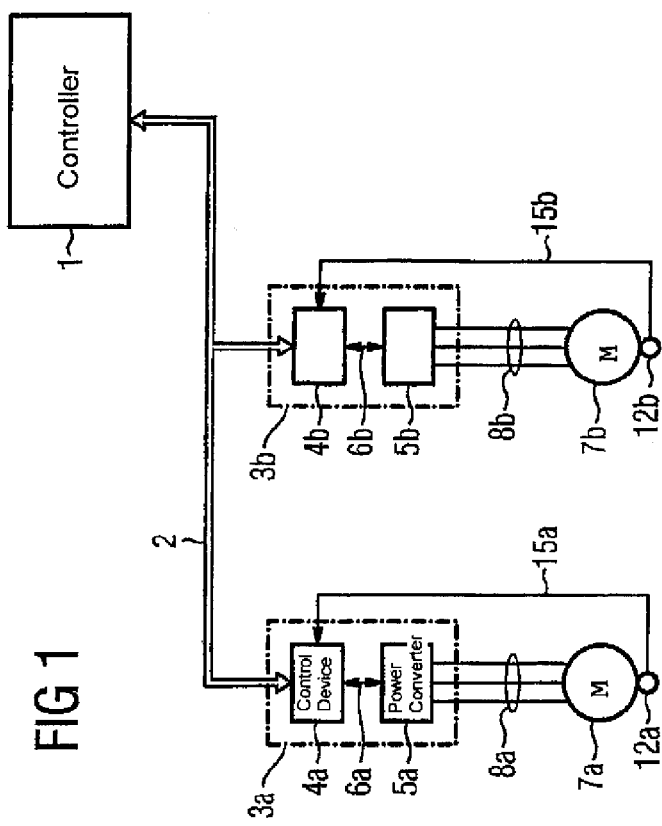
Figure 2:
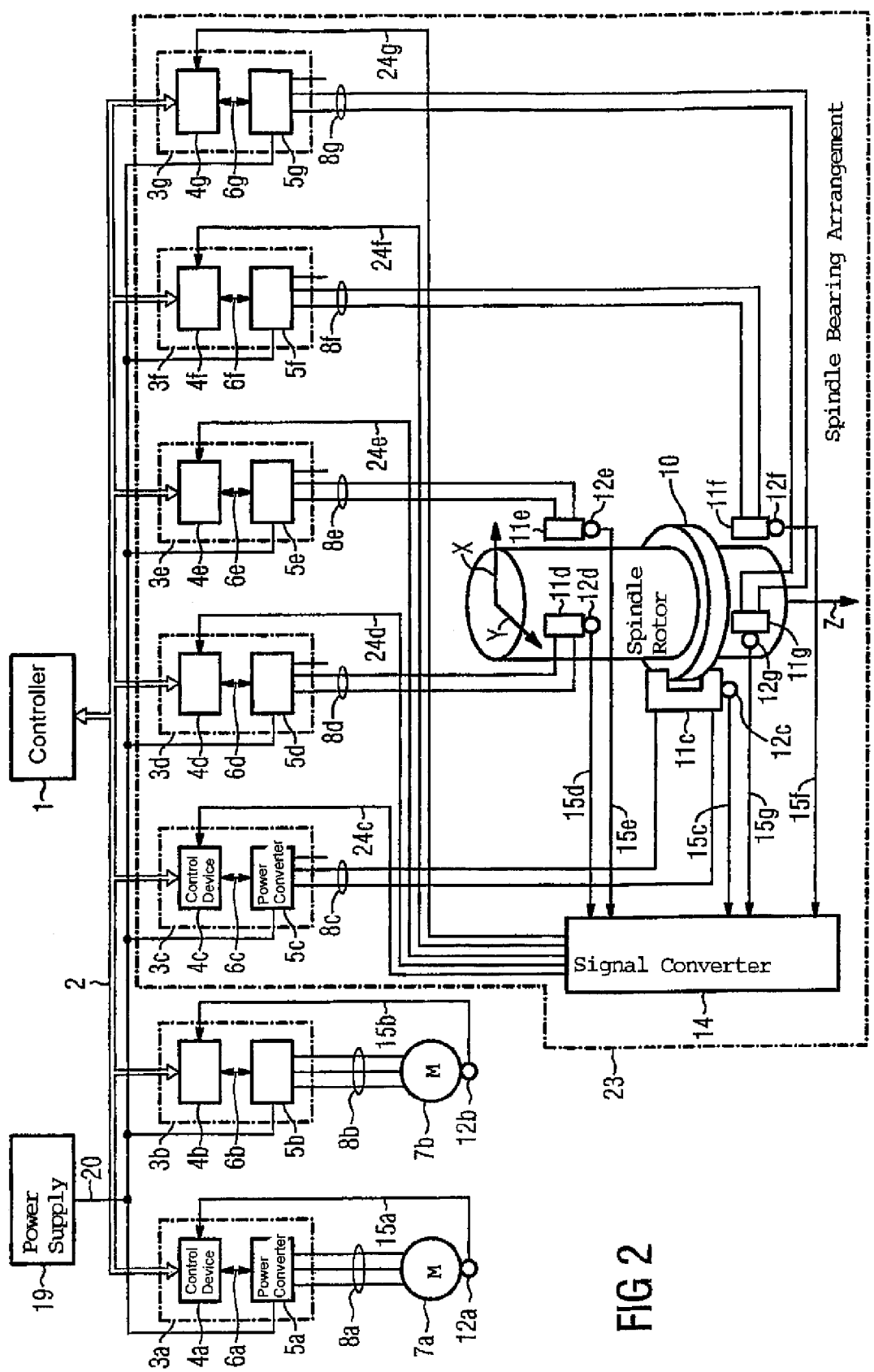
FIG. 2 shows a drive system according to the invention.

A drive system according to the invention is shown in the form of an exemplary embodiment in the block diagram according to FIG. 2. Compared with the embodiment according to FIG. 1 known from the prior art, a magnetic spindle bearing arrangement 23 in integrated in the drive system according to the invention. Just as in the embodiment according to FIG. 1, a controller 1 in the embodiment according to FIG. 2 is connected via a data bus for the exchange of data to the two drive devices 3a and 3b for activating the drive motors 7a and 7b and in particular to the control devices 4a and 4b for the exchange of data.

The control device 4a and 4b activates a respectively associated power converter 5a and 5b via a respectively associated connection 6a and 6b. The power converters 5a and 5b activate respectively associated drive motors 7a and 7b via respectively associated 3-phase lines 8a and 8b. In this case, each drive motor 7a and 7b activates a respective machine axis of the machine. A respective actual position encoder 12a and 12b is assigned to each drive motor 7a and 7b, an actual position signal 15a being fed as input variable to the control device 4a by the actual position encoder 12a and an actual position signal 15b being fed as input variable to the control device 4b by the actual position encoder 12b. In this case, each drive device comprises a control device and a power converter, although the control device and the power converter need not necessarily be accommodated in a common housing. The control device and power converter may also quite easily be in the form of separate components. The controller 1, for example, inputs position setpoints into the control device 4a and 4b via the data bus 2. The actual position values 15a and 15b are then controlled in accordance with the position setpoints input by the controller 1 and the machine axes are moved in this way.

To this extent, the embodiment according to FIG. 2 corresponds to the embodiment according to FIG. 1. In contrast to the embodiment according to FIG. 1, however, the magnetic spindle bearing arrangement 23 in the drive system according to the invention according to FIG. 2 is integrated in the drive system. For each magnetic bearing 11c, 11d, 11e, 11f and 11g, a respectively associated further drive device 3c, 3d, 3e, 3f and 3g for activating a respectively associated bearing 11c, 11d, 11e, 11f and 11g is provided. In an analogous manner to the drive devices 3a and 3b, each of these five further drive devices 3c, 3d, 3e, 3f and 3g has a respectively associated control device 4c, 4d, 4e, 4f and 4g and a respectively associated power converter 5c, 5d, 5e, 5f and 5g. The control devices and the power converters in this case need not necessarily be accommodated in a common housing, but may also be realized in the form of separate subassemblies. Just as in the case of the drive devices 3a and 3b, the further drive devices 3c, 3d, 3e, 3f and 3g, in particular the control devices 4c, 4d, 4e, 4f and 4g, are connected to the controller 1 via a data bus 2 for the exchange of data. The control devices 4c, 4d, 4e, 4f and 4g are connected to the respectively associated power converters 5c, 5d, 5e, 5f and 5g for the exchange of data, which is indicated by double arrows 6c, 6d, 6e, 6f and 6g. The control devices 4c, 4d, 4e, 4f and 4g activate the respectively associated power converters 5c, 5d, 5e, 5f and 5g, which in turn activate the respectively associated magnetic bearings 11c, 11d, 11e, 11f and 11g.

In the embodiment according to FIG. 2, the further drive devices 3c, 3d, 3e, 3f and 3g which serve to activate the magnetic bearings 11c, 11d, 11e, 11f and 11g have hardware identical to that of the drive devices 3a and 3b which serve for the activation of the drive motors 7a and 7b for moving the machine axes of the machine. This standardized hardware results in greater reliability and availability of the drive system according to the invention compared with conventional drive systems. At the same time, the costs for procuring the drive devices are reduced. The integrated, uniform control structure reduces the labor cost during start-up and maintenance.

Commercially available power converters for activating drive motors are of 3-phase design as a rule. However, the magnetic bearings of the magnetic spindle bearing arrangement 23 according to FIG. 2 are of electrical 2-phase design. The power converters 5c, 5d, 5e, 5f and 5g are connected to the respectively associated magnetic bearings 11c, 11d, 11e, 11f and 11g via 2-phase lines 8c, 8d, 8e, 8f and 8g. The third phase not used is indicated by a respective stroke in FIG. 2 at the power converters 5c, 5d, 5e, 5f and 5g. The control devices 4c, 4d, 4e, 4f and 4g are in this case set in such a way that the two respective current-carrying phases of the power converters 5c, 5d, 5e, 5f and 5g have a current of identical magnitude but opposite sign. The power converters 5c, 5d, 5e, 5f and 5g may then be regarded as controllable power sources, to which the magnetic bearings 11c, 11d, 11e, 11f and 11g of the magnetic spindle bearing arrangement 23 are connected. With this procedure, the existing hardware of the third de-energized phase is certainly not used, but it has the great advantage that standard drive devices, in particular standard power converters, can be used, which are very cost-effective due to their large scale manufacture.

If the control devices 4c, 4d, 4e, 4f and 4g are designed as control devices which normally serve to control motors, then the requirement that two respective current-carrying phases of a power converter are to have a current of identical magnitude but opposite sign can be achieved especially simply by virtue of the fact that, for example, the commutation angle, required for the control device, for controlling a normally connected motor is set to a fixed, only slightly variable value inside the control device, the fixed commutation angle in the process being selected in such a way that the current only flows in two phases of the power converter and the third phase is de-energized.

If, as in the exemplary embodiment according to FIG. 2, commercially available drive motors are used, as are normally used for activating the drive motors for the machine axis of the machines, their control devices in particular can often process only incremental encoder signals. Since the actual position encoders 12c, 12d, 12e, 12f and 12g which measure the position of the rotor spindle 10 output respectively associated analog actual position signals 15c, 15d, 15e, 15f and 15g, said signals must be converted into incremental actual position signals 24c, 24d, 24e, 24f and 24g before they can be fed to the respectively associated control devices 4c, 4d, 4e, 4f and 4g. To this end, the analog actual position signals 15c, 15d, 15e, 15f and 15g are fed from the respectively associated actual position encoders 12c, 12d, 12e, 12f and 12g to a signal converter 14, which converts the analog actual position signals 15c, 15d, 15e, 15f and 15g into incremental actual position signals 24c, 24d, 24e, 24f and 24g and feeds them to the respectively associated control devices 4c, 4d, 4e, 4f and 4g as input variables.

Owing to the fact that, in the drive system according to the invention, all the drive devices can communicate with the controller 1, the geometric manipulating range of the magnetic spindle bearing arrangement 23 can be actively included in the motion guidance of the machine axes. This is especially appropriate, for example, when actively vibration-damping measures are to be realized, for example for stabilizing a tool. Furthermore, due to this measure, the state of the magnetic spindle bearing arrangement 23 can be diagnosed to the full extent by the controller 1. This enables very meaningful information from the magnetic spindle bearing arrangement 23 to be included in processes, for example for monitoring for tool fracture, at no extra cost.

The interconnected control structure reduces the labor cost during start-up and maintenance. The standardized hardware of the drive devices permits an increase in the reliability and availability of the drive system according to the invention, with at the same time a reduction in the costs for procuring the control devices and power converters for the magnetic spindle bearing arrangement.

In the exemplary embodiment according to FIG. 2, all the drive devices, in particular all the power converters, are connected to a common grid power supply device 19 via a supply line 20 for the electrical power supply. In conventional drive systems, in which the magnetic spindle bearing arrangement is not integrated in the drive system, separate grid power supply devices are often used for the power supply for the drive devices 3a and 3b for activating the drive motors 7a and 7b and for the performance module 16 according to FIG. 1, which has an adverse effect with regard to desired standardized hardware.

Figure 3:
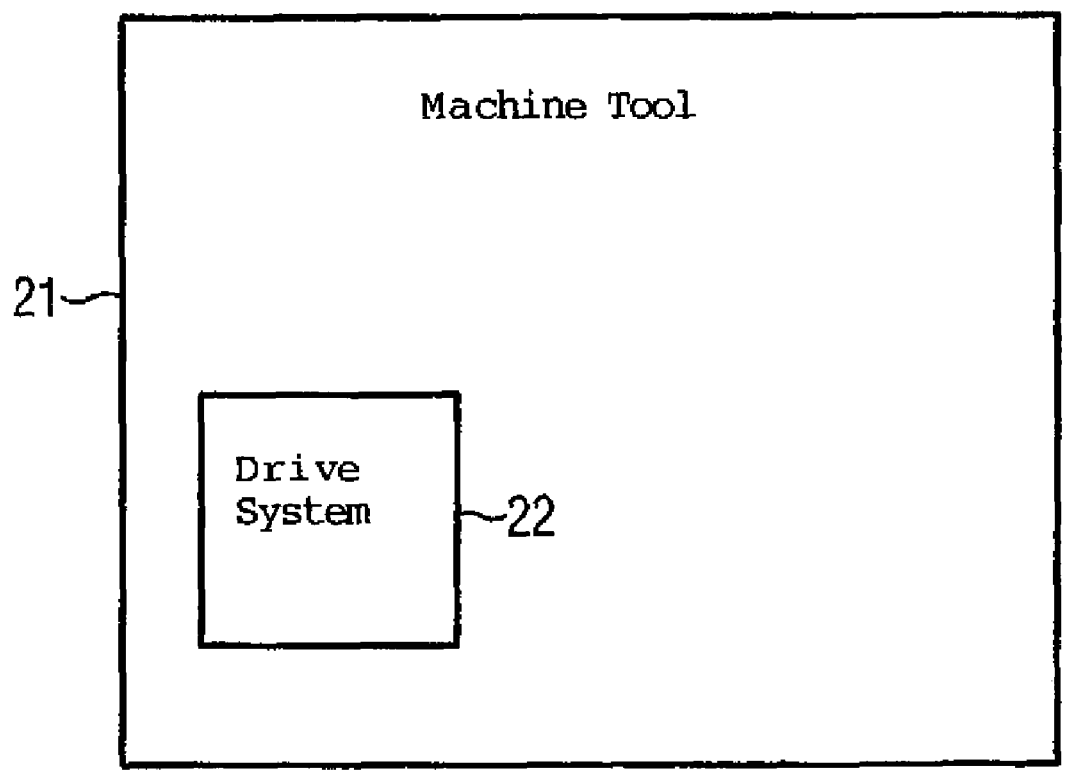
FIG. 3 shows a machine tool.

A machine tool 21 in which the drive system 22 according to the invention is integrated is shown in FIG. 3 in the form of a block diagram. Instead of the machine tool 21, however, a production machine or a robot could also be formed with the drive system 22 according to the invention.

What is claimed is:
1. A drive system comprising:
a controller;
first and second drive devices connected to grid power supply device and including each a control device and a 3-phase power converter, said first and second drive devices implemented with identical hardware;
a data bus, connecting the first and second drive devices to the controller, for exchange of data,
a drive motor connected to and controlled by the first drive device; and
a magnetic spindle bearing arrangement having a magnetic bearing which is connected to and controlled by two current-carrying phases of the 3-phase power converter of the second drive device,
wherein the two current-carrying phases supply a current of identical magnitude but opposite polarity.

2. The drive system of claim 1, further comprising a signal converter for converting an analog actual position signal from the magnetic spindle bearing arrangement to an incremental actual position signal.

3. The drive system of claim 1, wherein a commutation angle for controlling the 3-phase power converter of the first drive device is fixed, with the fixed commutation angle being selected such that current only flows through the two current-carrying phases of the power converter of the second drive device, while a third phase of the 3-phase power converter of the second drive device is permanently de-energized.

4. A machine tool, production machine or robot having a drive system, said drive system comprising:
- first and second drive devices connected to a grid power supply device and including each a control device and a 3-phase power converter, said first and second drive devices implemented with identical hardware;
- a data bus, connecting the first and second drive devices to the controller, for exchange of data,
- a drive motor connected to and controlled by the first drive device; and
- a magnetic spindle bearing arrangement having a magnetic bearing which is connected to and controlled by two current-carrying phases of the 3-phase power converter of the second drive device,
- wherein the two current-carrying phases supply a current of identical magnitude but opposite polarity.

5. The machine tool, production machine or robot of claim 4, further comprising a signal converter for converting an analog actual position signal from the magnetic spindle bearing arrangement to an incremental actual position signal.

6. The machine tool, production machine or robot of claim 4, wherein a commutation angle for controlling the 3-phase power converter of the first drive device is fixed, with the fixed commutation angle being selected such that current only flows through the two current-carrying phases of the power converter of the second drive device, while a third phase of the 3-phase power converter of the second drive device is permanently de-energized.

* * * * *

UNITED STATES PATENT AND TRADEMARK OFFICE
CERTIFICATE OF CORRECTION

| | | |
|---|---|---|
| PATENT NO. | : 7,800,334 B2 | |
| APPLICATION NO. | : 11/569375 | |
| DATED | : September 21, 2010 | |
| INVENTOR(S) | : Jens Hamann et al. | |

It is certified that error appears in the above-identified patent and that said Letters Patent is hereby corrected as shown below:

Title Page,

[73] Assignee: replace "Müchen" with the correct --München--.

In the claims:    Claim 1, column 6, line 53: before "grid" insert --a--.

Signed and Sealed this
Twenty-eighth Day of December, 2010

David J. Kappos
*Director of the United States Patent and Trademark Office*